US007720131B2

(12) United States Patent
Srivastava et al.

(10) Patent No.: US 7,720,131 B2
(45) Date of Patent: May 18, 2010

(54) ITERATIVE PILOT-AIDED FREQUENCY OFFSET ESTIMATION AND C/I MEASUREMENT FOR TDMA SIGNAL WITH OFFSET LARGER THAN NYQUIST FREQUENCY OF THE REFERENCE SYMBOL RATE

(75) Inventors: Vikash Srivastava, Boyds, MD (US); Meng Chen, Frederick, MD (US)

(73) Assignee: PC-Tel, Inc., Bloomingdale, IL (US)

( * ) Notice: Subject to any disclaimer, the term of this patent is extended or adjusted under 35 U.S.C. 154(b) by 569 days.

(21) Appl. No.: 11/769,537

(22) Filed: Jun. 27, 2007

(65) Prior Publication Data

US 2008/0187081 A1  Aug. 7, 2008

Related U.S. Application Data

(60) Provisional application No. 60/888,005, filed on Feb. 2, 2007.

(51) Int. Cl.
*H04L 27/30* (2006.01)
(52) U.S. Cl. .................. 375/144; 375/148; 375/349; 375/365; 370/503; 455/67.11; 455/226.1
(58) Field of Classification Search .......... 375/140, 375/141, 144, 147, 148, 284, 285, 326, 340, 375/346, 349, 362, 365, 368; 370/503, 509, 370/512–514, 516; 455/67.11, 67.13, 182.2, 455/192.2, 226.1–226.3
See application file for complete search history.

(56) References Cited

U.S. PATENT DOCUMENTS 4,621,365 A  11/1986  Chiu

| 5,594,718 | A | 1/1997 | Weaver, Jr. et al. |
| 5,640,431 | A | 6/1997 | Bruckert et al. |
| 5,724,388 | A | 3/1998 | Nagano et al. |
| 6,219,391 | B1 * | 4/2001 | Nakano ................ 375/346 |
| 6,625,237 | B2 | 9/2003 | Talwalkar et al. |
| 7,480,497 | B2 * | 1/2009 | Biswas et al. .......... 455/168.1 |
| 7,675,989 | B2 * | 3/2010 | Ahn et al. ............... 375/267 |
| 2003/0181183 | A1 * | 9/2003 | Ventura ................. 455/258 |
| 2006/0182209 | A1 | 8/2006 | Coyne et al. |

FOREIGN PATENT DOCUMENTS

| EP | 1 566 933 A2 | 8/2005 |
| EP | 1 566 933 A3 | 8/2005 |

OTHER PUBLICATIONS

Extended European Search Report for corresponding EP Application No. 08 10 1182.

(Continued)

*Primary Examiner*—Dac V Ha
(74) *Attorney, Agent, or Firm*—Husch Blackwell Sanders Welsh & Katz

(57) ABSTRACT

A method and apparatus are provided for decoding a wireless signal from a set of samples with an embedded training sequence. The method includes the steps of determining a first frequency offset from the samples where the first frequency offset is assumed to be less than a Nyquist frequency of the training sequence and calculating a first carrier to interference ratio based upon the first frequency offset. The method further includes the steps of determining a second frequency offset from the samples by subtracting an absolute value of the first frequency offset from an integer multiple of the Nyquist frequency and giving the second frequency offset a sign opposite that of the first frequency offset, calculating a second carrier to interference ratio based upon the second frequency offset and selecting one of the first and second frequency offsets based upon a relative values of the calculated carrier to interference ratios.

21 Claims, 2 Drawing Sheets

OTHER PUBLICATIONS

Steven Kay, A Fast and Accurate Single Frequency Estimator, IEEE transactions on acoustics, speech and signal processing, ASSP-37, Dec. 1989.

M. P. Fitz, Planar Filtered Techniques for Burst Mode Carrier Synchronization, Conf. Rec. Globecom '91, Phoenix, Arizona, Dec. 2-5, 1991, paper 12.1.

* cited by examiner

DCC DETECTION PERCENTAGE
VS
C/I WITH FREQUENCY OFFSET 300 Hz

ITERATIVE PILOT-AIDED FREQUENCY OFFSET ESTIMATION AND C/I MEASUREMENT FOR TDMA SIGNAL WITH OFFSET LARGER THAN NYQUIST FREQUENCY OF THE REFERENCE SYMBOL RATE

FIELD OF THE INVENTION

The field of the invention relates to communication devices and more particularly to wireless communication devices.

BACKGROUND OF THE INVENTION

Time division multiple access (TDMA) communication systems are known. Such systems typically include one or more base stations through which portable wireless devices (e.g., personal digital assistants (PDAs), cell phones, etc.) can access other devices or wireline communication services.

In order to gain access through a base station, the portable device may first monitor one or more control channels to detect a signal from a base station. In order to facilitate access, the base station may transmit an identification signal on the control channel.

In TDMA wireless systems, it is important for the receiver to acquire timing and frequency synchronization in order to correctly demodulate the received data signal and to accurately measure the carrier to interference ratio. Both of these objectives can be achieved by a transmitting device embedding a known stream of symbols in the transmitted signal. These known symbols are often referred to as reference symbols.

The known stream of embedded symbols may include at least some SYNCH and/or PILOT symbols. SYNCH symbols are used primarily for timing estimation and PILOT symbols are used primarily for frequency estimation.

The receiver can process the SYNCH symbols to obtain time synchronization by correlating the received SYNCH symbols with known values for the SYNCH symbols within a repeating frame structure. Once time synchronization has been achieved, the receiver may use the PILOT symbols to estimate a frequency offset.

The frequency offset is the difference between the received signal carrier frequency and the locally generated reference frequency. The frequency offset may be caused by any of a number of different factors internal to the portable devices (e.g., clock offset, Doppler effects, asynchronous clock drift, etc.).

For reference symbols (e.g., pilot symbols) with a repetition frequency of $F_p$, the maximum frequency offset that can be estimated using conventional methods (without introducing aliasing) is $F_p/2$ (i.e., the Nyquist frequency of the pilot symbol repetition rate). If the frequency offset is greater than $F_p/2$, then conventional methods may incorrectly estimate the frequency, and carrier to interference (C/I) measurements will be severely degraded resulting in improper channel selection, demodulation errors and high symbol error rates. Accordingly, a need exists for better methods of calculating C/I values.

SUMMARY

A method and apparatus are provided for decoding a wireless signal from a set of samples with an embedded training sequence. The method includes the steps of determining a first frequency offset from the samples where the first frequency offset is assumed to be less than a Nyquist frequency of the training sequence and calculating a first carrier to interference ratio based upon the first frequency offset. The method further includes the steps of determining a second frequency offset from the samples by subtracting an absolute value of the first frequency offset from an integer multiple of the Nyquist frequency and giving the second frequency offset a sign opposite that of the first frequency offset, calculating a second carrier to interference ratio based upon the second frequency offset and selecting one of the first and second frequency offsets based upon a relative values of the calculated carrier to interference ratios.

In another aspect, the method includes selecting one of the first and second frequency offsets further comprising selecting the frequency offset providing a carrier to interference ratio with a greatest relative value.

In another aspect, the method includes calculating the carrier to interference ratio (C/I) further comprises determining a carrier energy ($E_C$) of the wireless signal.

In another aspect, the step of determining the carrier energy further includes correlating SYNC and PILOT symbols with a set of reference SYNC and PILOT symbols.

In another aspect, the method includes determining a received channel power ($I_O$).

In another aspect, the step of determining the received channel power ($I_O$) further includes squaring and summing each sample of the set of samples.

In another aspect the step of calculating the carrier to interference ratio further comprises solving the equation $$C/I = \frac{\left(\frac{E_c}{I_o}\right)}{\left(1 - \frac{E_c}{I_o}\right)}.$$

DETAILED DESCRIPTION OF AN ILLUSTRATED EMBODIMENT

Figure 1:
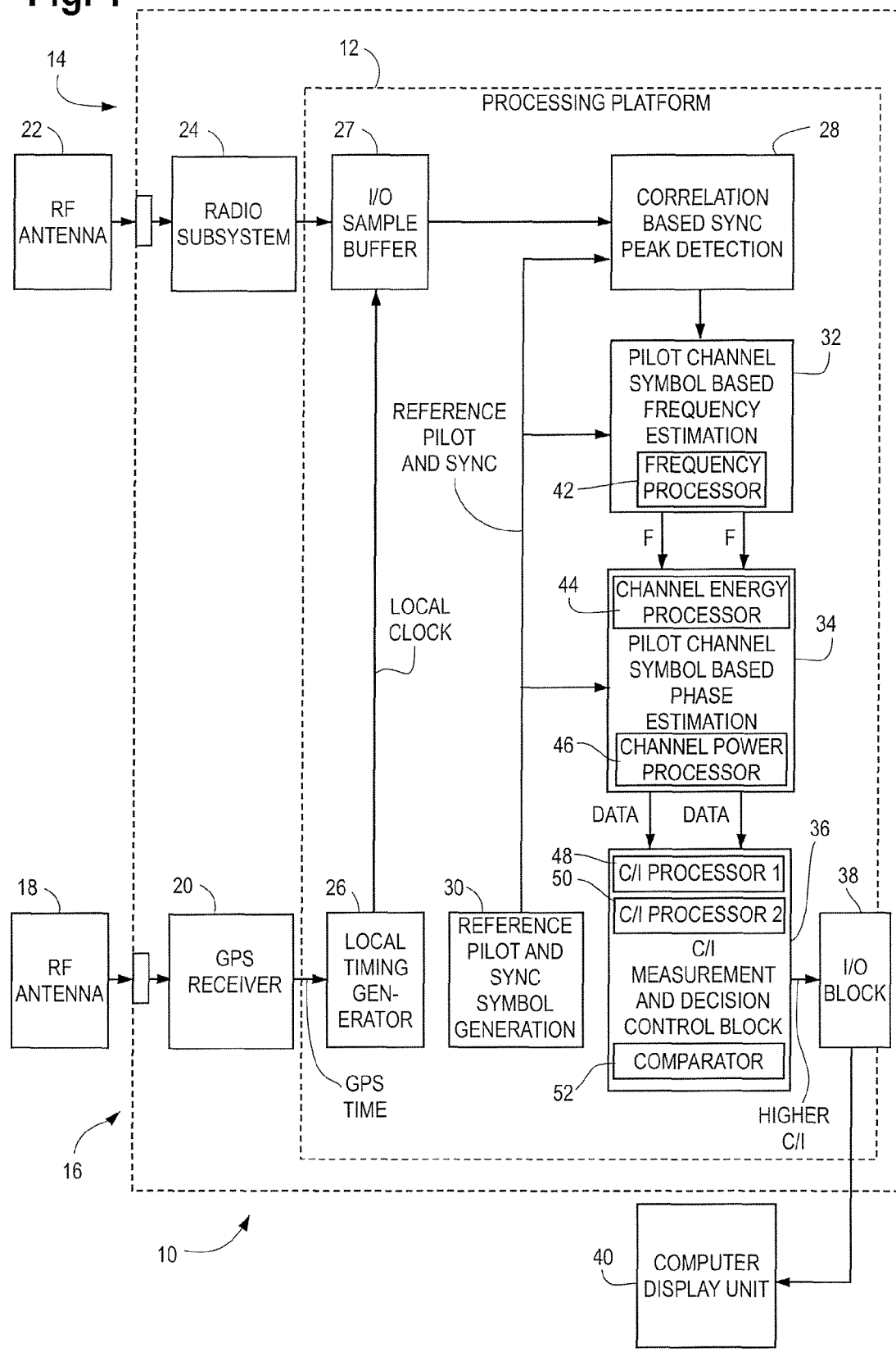
FIG. 1 shows a portion of a transceiver in accordance with an illustrated embodiment of the invention.
Figure 2:
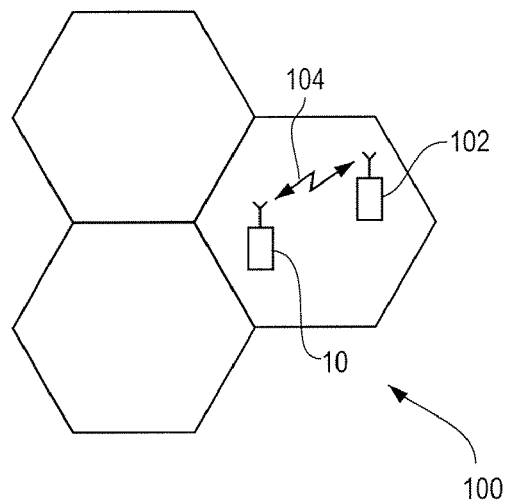
FIG. 2 shows a communication system using the transceiver of FIG. 1.

FIG. 1 is a portion of a radio transceiver 10 shown generally in accordance with an illustrated embodiment of the invention. The radio transceiver 10 uses a novel frequency offset estimation method for carrier-to-interference measurement. The radio transceiver 10 may be used in a narrow band time division multiple access (TDMA) cellular radio communication system 100 such as that shown in FIG. 2.

In TDMA wireless receiver systems 100, a frequency offset between a received signal 104 and a locally generated reference signal is frequently encountered due to clock drift, Doppler Effect and asynchronous timing reference systems. The frequency offset estimation is an essential step for carrier-to-interference (C/I) measurement. Prior pilot-aided frequency offset estimation systems had taught that an upper bound on the maximum frequency offset that can be estimated is the Nyquist frequency of the reference symbol repetition rate. When the frequency offset is larger than the Nyquist frequency, conventional frequency offset estimation methods cannot provide correct frequency offset values. This results in severely degraded carrier-to-interference measurement and complete loss of frequency synchronization in some scenarios. To overcome this issue, an iterative pilot-aided frequency offset method is provided that can accurately estimate frequency offset values that are larger than the Nyquist frequency of the pilot repetition rate. The iterative pilot-aided frequency offset method described below integrates frequency offset estimation and carrier-to-interference calculation algorithms together, and provides accurate frequency offset in an iterative manner. It is shown to provide a dramatic improvement on carrier-to-interference measurement for TDMA based system with relatively large frequency offsets between transmitter and the receiver.

The radio transceiver 10 accurately measures the C/I ratio and frequency offset within the TDMA based system 100, when the frequency offset in the received signal is significantly more than the Nyquist frequency of the reference symbol repetition rate, $F_p$. This scenario can occur when a receiver has a single stage frequency estimation/correction block or the coarse frequency estimation block is not able to bring the frequency offset below the Nyquist frequency of the reference symbol repetition rate. Note that the approach described herein has substantial advantages when the data collection is in short bursts, i.e., the channel data is collected only for a short period of time. In this case, other conventional estimation techniques such as phase-lock-loop and direct frequency estimator, cannot effectively facilitate frequency synchronization.

Turning now to FIG. 1, the radio transceiver 10 may include a processing platform 12, a reference receiver 16 and a signal receiver 14. The reference receiver 16 may receive a Global Positioning System (GPS) signal through an antenna 18 and provide the received signal to a GPS receiver 20 where a GPS Time signal is recovered from the signal. The GPS Time signal is used within a local timing generator 26 to generate a local clock signal.

The signal receiver 14 may receive a signal 104 from a local base station 102 of the communication system 100. The signal 104 may be reduced to base band within a radio subsystem 24 and sampled and stored within an I/O sample buffer 27 to provide a set of I and Q values for each sampling interval under control of the local clock.

The sampled signal from the buffer 27 may be provided as an input to a correlation processor 28 where the sampled signal is correlated with a known SYNC sequence. The known SYNC sequence may be retrieved from a memory or generated within a reference PILOT and SYNC symbol generator processor 30.

Within the SYNC processor 28, the signal samples are continuously compared with the known SYNC sequence until a match is detected. Detection of a match provides the radio transceiver 10 with frame synchronization.

The signal samples are then passed to a pilot channel symbol based frequency estimation processor 32. Within the estimation processor 32, the I and Q values of the PILOT symbols from the sampled signal are compared with a reference set of symbols from the generator 30. In this case, frame synchronization identifies the location of PILOT symbols within the frame or multiframe. The estimation processor 32 functions to determine a phase of a PILOT symbol in a PILOT location and then an overall difference of the phase at a previous PILOT location and a current PILOT location. This phase difference is divided by the PILOT period (M*T, where M represents the number of symbols between successive PILOT symbol locations and T is the symbol period) to obtain an estimate, F, of the residual frequency error at the output of the estimation processor 32.

With a reference symbol repetition rate of $F_p$ Hz for the signal 104, conventional frequency estimation methods can only provide a value of frequency offset $F=F_O$ (Hz) in the frequency range of from $-F_p/2$ to $F_p/2$. This estimated value, $F_O$, would be correct if the original frequency offset is less than $F_p/2$. Otherwise, it is incorrect due to aliasing. For conventional frequency estimate methods, it may be observed that there is an ambiguity in the estimation for the frequency offset greater than $F_p/2$. In fact, for a given estimate $F_O$, the actual frequency offset could be:

$$-F_p+F_O, \text{ for } F_O>0 \text{ and } F_O<|F_p/2| \quad (1)$$

$$F_p+F_O, \text{ for } F_O<0 \text{ and } F_O<|F_p/2| \quad (2)$$

Therefore, using frequency offset estimation $F_O$ obtained via conventional methods, the radio transceiver 10 will perform the following additional steps to resolve the ambiguity. As a first step, a frequency processor 42 within the frequency estimation processor 32 calculates another frequency F' using either equation (1) or (2) based on the sign of the original estimate F. For example, if $F_p$ were to be equal to some frequency value (e.g., 50 Hz), then Fp/2=25 Hz. If F were to be estimated to be equal to 10 Hz, then (using equation (1)) F'=−40 Hz. However, F' is outside of the Nyquist frequency.

The frequency estimation processor 32 may pass the two values (F and F') to a pilot channel symbol based phase estimation processor 34. Within the phase estimation processor 34, the received PILOT symbols from the sample stream are compared to determine a phase change with regard to a local time base.

A carrier energy processor 44 within the frequency estimation processor 34 may calculate a carrier energy $E_C$. The carrier energy processor 44 may obtain the carrier energy $E_C$ by comparing the magnitude of the correlation between the received SYNC and PILOT symbols at the respective offset frequencies F and F' to their known values.

A channel power processor 46 within the frequency estimation processor 34 may also determine a received channel power $I_O$. The channel power processor 46 may determine the received channel power by summing the squares of the magnitude of each received sample at F and F'.

The values of the carrier energy $E_C$ and the channel power $I_O$ may be transferred to a C/I measurement and decision control block 36. Within the control block, a respective C/I processor 48, 50 may first determine a ratio of $E_C/I_O$ for F and F'. Finally, a respective C/I ratio for F and F' is determined within the respective processor 48, 50 by solving the equation $$C/I = \frac{\left(\frac{E_c}{I_o}\right)}{\left(1-\frac{E_c}{I_o}\right)}.$$

As a final step, the CIP processors 48, 50 transfers the C/I values to a comparator 52 that selects the frequency offset F or F' which provided the higher C/I ratio. In this step, the radio transceiver 10 has combined the frequency offset estimation and C/I calculation in order to increase the upper bound of frequency offset that can be handled by the conventional methods.

The above method may be used in any of a number of situations and usually iteratively. For example, the method may be used for selection of the nearest base station 102 in the system 100. Alternatively, the method may be used in an iterative manner to detect and track changes in a communication channel.

It should be noted that, while the assumption has been made that frequency offset is between −Fp and Fp in this discussion, the above approach can be extended to any window of frequency offset (integer multiple of the Nyquist value) by using the aliasing analogy under the Nyquist sampling theorem discussed above. At the expense of processing power and memory storage requirement, the proposed method can be extended to estimate arbitrarily large frequency offsets given that appropriate channel filters are utilized.

Figure 3:
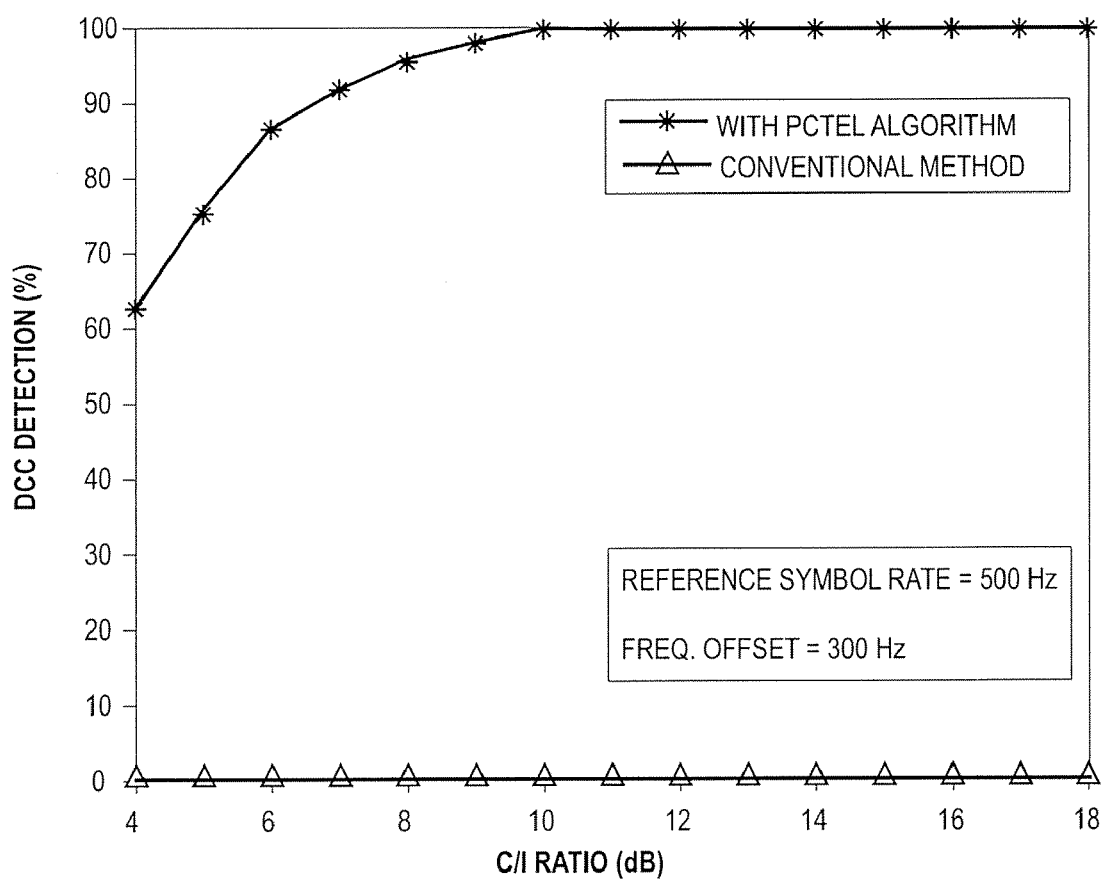
FIG. 3 shows a comparison of the reliable detection by the transceiver of FIG. 1 and a conventional transceiver.

A representative simulation result is shown in FIG. 3. Here, a digital color code detection rate based on conventional frequency offset method and the described method are compared. The digital color code is the information that is modulated on the transmitted signal by the base station. This information is used by the receivers to distinguish between various base stations. The resulting graph shows the digital color code demodulation performance under various offset conditions.

It can be seen in FIG. 3 that the described method provided excellent performance when conventional methods fail. As shown in FIG. 3, with a C/I ratio of 10 dB, the digital color code is detected by the radio transceiver 10 approximately 100% of the time while conventional receiver detects the digital color code 0% of the time. Moreover, with a C/I ratio of 6 dB, the receiver detects the digital color code is detected by the radio transceiver 10 approximately 87% of the time versus 0% for a conventional system.

A specific embodiment of method and apparatus for determining an offset frequency has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of decoding a wireless signal from a set of samples with an embedded training sequence comprising:
    determining a first frequency offset from the samples where the first frequency offset is assumed to be less than a Nyquist frequency of the training sequence;
    calculating a first carrier to interference ratio based upon the first frequency offset;
    determining a second frequency offset from the samples by subtracting an absolute value of the first frequency offset from an integer multiple of the Nyquist frequency and giving the second frequency offset a sign opposite that of the first frequency offset;
    calculating a second carrier to interference ratio based upon the second frequency offset; and
    selecting, using a selector, one of the first and second frequency offsets based upon a relative values of the calculated carrier to interference ratios.

2. The method of decoding the wireless signal as in claim 1 wherein the step of selecting one of the first and second frequency offsets further comprising selecting the frequency offset providing a carrier to interference ratio with a greatest relative value.

3. The method of decoding the wireless signal as in claim 1 wherein the step of calculating the carrier to interference ratio (C/I) further comprises determining a carrier energy ($E_C$) of the wireless signal.

4. The method of decoding the wireless signal as in claim 3 wherein the step of determining the carrier energy further comprises correlating SYNC and PILOT symbols with a set of reference SYNC and PILOT symbols to determine a peak correlation.

5. The method of decoding the wireless signal as in claim 4 further comprising determining a received channel power ($I_O$).

6. The method of decoding the wireless signal as in claim 5 wherein the step of determining the received channel power ($I_O$) further comprises squaring and summing each sample of the set of samples.

7. The method of decoding the wireless signal as in claim 5 wherein the step of calculating the carrier to interference ratio further comprises solving the equation $$C/I = \frac{\left(\frac{E_c}{I_o}\right)}{\left(1 - \frac{E_c}{I_o}\right)}.$$

8. An apparatus for decoding a wireless signal from a set of samples with an embedded training sequence, such apparatus comprising:
    means for determining a first frequency offset from the samples where the first frequency offset is assumed to be less than a Nyquist frequency of the training sequence;
    means for calculating a first carrier to interference ratio based upon the first frequency offset;
    means for determining a second frequency offset from the samples by subtracting an absolute value of the first frequency offset from an integer multiple of the Nyquist frequency and giving the second frequency offset a sign opposite that of the first frequency offset;
    means for calculating a second carrier to interference ratio based upon the second frequency offset; and
    means for selecting one of the first and second frequency offsets based upon a relative values of the calculated carrier to interference ratios.

9. The apparatus for decoding the wireless signal as in claim 8 wherein the means for selecting one of the first and second frequency offsets further comprising means for selecting the frequency offset providing a carrier to interference ratio with a greatest relative value.

10. The apparatus for decoding the wireless signal as in claim 8 wherein the means for calculating the carrier to interference ratio (C/I) further comprises means for determining a carrier energy ($E_C$) of the wireless signal.

11. The apparatus for decoding the wireless signal as in claim 10 wherein the means for determining the carrier energy further comprises means for correlating SYNC and PILOT symbols with a set of reference SYNC and PILOT symbols to determine a peak correlation.

12. The apparatus for decoding the wireless signal as in claim 11 further comprising means for determining a received channel power ($I_O$).

13. The apparatus for decoding the wireless signal as in claim 12 wherein the means for determining the received channel power ($I_O$) further comprises means for squaring and summing each sample of the set of samples.

14. The apparatus for decoding the wireless signal as in claim 12 wherein the means for calculating the carrier to interference ratio further comprises means for solving the equation $$C/I = \frac{\left(\frac{E_c}{I_o}\right)}{\left(1 - \frac{E_c}{I_o}\right)}.$$

15. An apparatus for decoding a wireless signal from a set of samples with an embedded training sequence, such apparatus comprising:
   a pilot channel symbol based frequency estimation processor that determining a first frequency offset from the samples where the first frequency offset is assumed to be less than a Nyquist frequency of the training sequence;
   a first carrier to interference ratio (C/I) processor that calculates a first carrier to interference ratio based upon the first frequency offset;
   a frequency processor that determines a second frequency offset from the samples by subtracting an absolute value of the first frequency offset from an integer multiple of the Nyquist frequency and giving the second frequency offset a sign opposite that of the first frequency offset;
   a second C/I processor that calculates a second carrier to interference ratio based upon the second frequency offset; and
   a comparator that selects one of the first and second frequency offsets based upon a relative values of the calculated carrier to interference ratios.

16. The apparatus for decoding the wireless signal as in claim 15 wherein the comparator selects the frequency offset providing a carrier to interference ratio with a greatest relative value.

17. The apparatus for decoding the wireless signal as in claim 15 further comprise a carrier energy processor that determines a carrier energy ($E_C$) of the wireless signal.

18. The apparatus for decoding the wireless signal as in claim 17 wherein the pilot channel symbol based frequency estimation processor correlates SYNC and PILOT symbols with a set of reference SYNC and PILOT symbols to determine a peak correlation.

19. The apparatus for decoding the wireless signal as in claim 18 further comprising a channel power processor that determines a received channel power ($I_O$).

20. The apparatus for decoding the wireless signal as in claim 19 wherein the channel power squares and sums each sample of the set of samples.

21. The apparatus for decoding the wireless signal as in claim 19 wherein the carrier to interference processor solves the equation $$C/I = \frac{\left(\frac{E_c}{I_o}\right)}{\left(1 - \frac{E_c}{I_o}\right)}.$$

* * * * *